UNITED STATES PATENT OFFICE 2,687,973

PREPARATION OF CALCIUM SULFATE-ZINC SULFIDE PIGMENTS

Herbert Mills, Liverpool, and Harold Ford, Widnes, England, assignors to Orr's Zinc White Limited, London, England No Drawing. Application October 18, 1949, Serial No. 122,142

Claims priority, application Great Britain October 21, 1948

2 Claims. (Cl. 106—293)

This invention relates to the preparation of composite calcium sulphate/zinc sulphide pigments. We have discovered that it is necessary to exclude or to eliminate calcium sulphide from the final product if a satisfactory paint is to be prepared from the pigment.

The pigments are prepared by reacting zinc sulphate and calcium hydrosulphide and calcining the product. The zinc sulphate and calcium hydrosulphide react to form a composite co-precipitated mixture of molecules of zinc sulphide and calcium sulphate and the gas hydrogen sulphide ($H_2S$), some of which is liberated from the slurry leaving the slurry saturated with the gas.

We prefer to ensure the exclusion of calcium sulphide by manufacturing the pigments according to the first method described in our co-pending application Serial No. 122,141, filed October 18, 1949, namely, by adding to the co-precipitate slurry a small portion of zinc sulphate followed after a short interval by calcium carbonate slurry to neutrality, alternate additions of zinc sulphate and calcium carbonate being made until hydrogen sulphide is eliminated, and then adding an excess of zinc sulphate to the substantially hydrogen sulphide-free and neutral slurry.

In instances where the application of this preferred method is not practicable we attain the desired result by the second method described in our co-pending application Serial No. 122,141, filed October 18, 1949, namely, by so conducting the calcining stage of the process that air is admitted to the heat treatment furnace during the calcining. Care must be taken in the course of calcining to ensure that there is a minimum formation of zinc oxide in consequence of the admission of air. Thus, in accordance with the present invention air is admitted to the heat-treatment or calcining furnace in quantity sufficient to achieve removal from the charge undergoing calcination of calcium sulphide but insufficient to cause any appreciable formation of zinc oxide. In carrying out the invention, air is admitted to the calcining furnace in a controlled manner for the purpose of eliminating calcium sulphide while maintaining the formation of zinc oxide in consequence of the admission of air at a minimum value.

The calcined powder may be further treated by the third method described in our co-pending application, Serial No. 122,141, filed October 18, 1949, namely, by quenching with water to form a slurry. To this slurry we add sulphuric or other mineral acid until the slurry reacts acid to an indicator preferably methyl orange or to a pH indicating meter, or other indicating means. Thereafter the slurry is washed, dried and ground according to the ordinary practice in the art.

In our copending application Serial No. 122,143, filed October 18, 1949, we disclose and claim a modified process.

We claim:

1. In the preparation of a composite calcium sulphate-zinc sulphide white pigment which when used in paint will be free from discolorization, in which zinc sulphate and calcium hydrosulphide are reacted and the co-precipitate calcined; the improvement in which the composite co-precipitate is calcined in the presence of an amount of air sufficient to eliminate calcium sulphide but insufficient to form an appreciable amount of zinc oxide.

2. In the preparation of a composite calcium sulphate-zinc sulphide white pigment substantially free from calcium sulphide in which a composite co-precipitate of calcium sulphate and zinc sulphide is formed and thereafter calcined; the improvement in which the co-precipitate is calcined in the presence of sufficient air to remove calcium sulphide but insufficient to cause any appreciable formation of zinc oxide.

References Cited in the file of this patent

UNITED STATES PATENTS

| Number | Name | Date |
|---|---|---|
| 1,399,500 | Kuzell | Dec. 6, 1921 |
| 1,474,766 | Daugherty | Nov. 20, 1923 |
| 1,886,165 | Christensen | Nov. 1, 1932 |
| 1,889,130 | Patterson | Nov. 29, 1932 |
| 1,977,583 | Hanahan | Oct. 16, 1934 |
| 2,016,537 | Booge | Oct. 8, 1935 |
| 2,112,357 | Butler et al. | Mar. 29, 1938 |
| 2,123,698 | Hanahan et al. | July 12, 1938 |

OTHER REFERENCES

"Comprehensive Treatise on Inorganic and Theoretical Chemistry," Mellor, vol. 3; Longmans, Green and Co., London, 1923; pages 744–45.